United States Patent [19]

George

[11] Patent Number: 5,166,252

[45] Date of Patent: Nov. 24, 1992

[54] POLYKETONE BLEND HAVING IMPROVED MECHANICAL PROPERTIES

[75] Inventor: Eric R. George, Houston, Tex.

[73] Assignee: Shell Oil Company, Houston, Tex.

[21] Appl. No.: 751,475

[22] Filed: Aug. 29, 1991

[51] Int. Cl.⁵ .............................................. C08L 75/00
[52] U.S. Cl. .................................. 524/449; 524/494; 524/502
[58] Field of Search ....................... 524/449, 494, 502; 523/214, 217

[56] References Cited

U.S. PATENT DOCUMENTS

| | | | |
|---|---|---|---|
| 4,843,144 | 6/1989 | Van Broekhoven et al. | 528/392 |
| 4,851,470 | 7/1989 | George | 524/612 |
| 4,874,801 | 10/1989 | George et al. | 523/214 |
| 4,880,865 | 11/1989 | George | 524/449 |

Primary Examiner—Paul R. Michl
Assistant Examiner—Umakant Rajguru
Attorney, Agent, or Firm—James O. Okorafor

[57] ABSTRACT

A polymer blend comprising: a) a linear alternating polymer of carbon monoxide and at least one ethylenically unsaturated hydrocarbon; b) a reinforcement material; and c) a thermoplastic polyurethane polymer. This polymer blend has and exhibits a good overall balance of physical properties including improved stiffness and heat resistance, and impact resistance and elongation at break over that of a polymer containing glass fibers alone. A process of preparing the polymer blend and articles of manufacture produced from the composition are also disclosed.

14 Claims, No Drawings

POLYKETONE BLEND HAVING IMPROVED MECHANICAL PROPERTIES

FIELD OF THE INVENTION

This invention generally relates to polyketone polymer blends. In particular, this invention relates to the impact modification of mineral filled and/or glass fiber reinforced polymers of carbon monoxide and at least one ethylenically unsaturated hydrocarbon.

BACKGROUND OF THE INVENTION

Polyketone polymers are generally known in the art. Of particular interest among polyketone polymers is the class of linear alternating polymers of carbon monoxide and at least one ethylenically unsaturated hydrocarbon. This particular class of polyketone polymers is disclosed and claimed in numerous patents assigned to Shell Oil Company.

The addition of glass fiber and/or mineral fillers to reinforce polyketone polymers is known in the art. These glass fiber reinforced polyketone polymer blends have improved properties, such as improved stiffness and heat resistance, and are generally stronger composites.

It is known in the art that impact modification of reinforced systems is difficult. It is also known that an adverse outcome of reinforcing polyketones with glass fibers is that the impact resistance of the polymer is comprised. Also compromised is the elongation to break of the polymer. Due to these difficulties, it is not obvious to one skilled in the art how to effectively impact modify reinforced systems.

These adverse effects of glass fiber reinforcements tends to potentially limit the utility of polyketone polymers. Therefore, it would be beneficial to prepare polyketone blends which are reinforced but do not have the disadvantages normally attributable to such reinforcement.

It is a discovery of this invention that the addition of a thermoplastic elastomer to a polyketone polymer reinforced blend results in a blend that has improved IZOD impact resistance and elongation-at-break over that of the blend containing only reinforcing materials.

SUMMARY OF THE INVENTION

It is a general object of this invention to provide a polyketone blend having a good balance of properties.

It is a particular object of this invention to provide a glass reinforced polyketone blend having improved IZOD impact resistance and elongation-at-break properties.

In accordance with this invention, it is now provided a polymer blend comprising a linear alternating polymer of carbon monoxide and at least one ethylenically unsaturated hydrocarbon, a reinforcement material, (glass fiber or minerals filler reinforcers) and a thermoplastic elastomer. Optionally, the blend may contain a small amount of an ethylene-carboxylic acid copolymer. This inventive polymer blend has and exhibits a good overall balance of properties including improved stiffness and heat resistance and improved IZOD impact resistance over that of the reinforced polymer without impact modifier.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), glass fiber or mineral filler reinforcers, and a thermoplastic elastomer. In general, the practice of this invention involves suitably admixing suitable quantities of the useful materials to form the inventive polymer blend.

The resulting polyketone polymer blend has utility as a thermoplastic material for example in the manufacturing and extrusion of articles. These articles can be shaped articles such as containers for food and drink, and parts for the automotive industry, including sucker rods, gears, and valve covers. These articles are produced by conventional methods exemplified by injection molding, and thermoforming.

The Polymer

The polyketone polymers which are employed as the major component of the filled polymer compounds of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone polymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO(CH$_2$CH$_2$)— units and the —CO(G)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

Reinforcement Materials

Reinforcement materials as used herein refers to glass fibers and mineral fillers. These materials are more fully described herein.

Glass Fiber Reinforcers

The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly a sodium silicate glass. Fibers produced of such glass are conventional and are commercially available from a number of U.S. and foreign glass companies. The fibers are useful as reinforcements for polymeric products and are commercially used as such. However, the physical dimensions of the glass fibers are of some importance to successful utilization in a particular application as are the presence or absence of a sizing material or a coupling agent for the glass and the nature of the sizing or coupling agent.

In the compositions of the invention, the glass fibers which contribute the most desirable properties to the composition are chopped glass fibers of circular cross-section. The fibers range in diameter from about $2 \times 10^{-4}$ inch to about $8 \times 10^{-4}$ inch, preferably from about $4 \times 10^{-4}$ inch to about $7 \times 10^{-4}$ inch. Fibers of greater or lesser diameter are satisfactory but fibers of too small a diameter do not provide the desired strength and fibers of too large a diameter contribute too much weight for the resulting strength and may not be economical. Although in some applications the long continuous fibers of glass are satisfactory, in the compositions of the invention it is preferred to use short fibers of glass. Lengths of glass fiber from about 0.1 inch to about 0.5 inch are suitable. While somewhat longer or somewhat shorter lengths are also useful, too long a glass fiber detracts from the processability of the composition while too short a fiber does not provide the desired strength. It is recognized that the actual length of the glass fibers in the composition will depend to some extent upon the method of blending or mixing the components, as this may mechanically break down the length of the glass fibers.

The glass fibers to be used as reinforcements for plastic materials may be treated to incorporate a sizing material. Such treated glass fibers are known in the art and are commercially available. The nature of the sizing material will influence the interfacial shear strength of the fiber and the polymer matrix, i.e., the degree to which the polymer and glass fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the glass fiber.

The interfacial shear strength is influenced by the polarity of the polymer so that for some polymers certain sizings or coupling agents work better than others. For the case of blends containing polyketone polymers a variety of sizings are suitable. Such sizings are generally characterized by the general nature of the size rather than the specific chemical structures which are often proprietary to the glass fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. For use in the blends of the invention, polar sizings are preferred, such as a sizing having a trimethoxysilane end group attached to a hydrocarbon chain with a terminal urethane functionality, although other hydrocarbon sizings having a trimethoxysilane end group are also quite suitable. Such fibers are commercially available and are exemplified by OCF 492, OCF408BD, and OCF 457 Fiberglass which are available from Owens-Corning Fiberglass. OCF 408BD has a polar sizing which is useful for producing high strength glassfiber reinforced polyketones.

Mineral Fillers

The term mineral fillers as used herein includes talc, clay, silica, calcium carbonate coated with an acidic substance such as stearic acid, wollastonite, franklinite and mica. Because of its high aspect ratio, mica is the preferred mineral filler.

Additional information relating to the mineral fillers that are useful in the practice of this invention can be found in U.S. Pat. Nos. 4,880,865, 4,874,801, and 4,851,470. The disclosure of these patents are herein incorporated by reference.

Thermoplastic Elastomers

Thermoplastic Elastomers as used herein refers to polymeric products which have both thermoplastic and elastomeric properties. This class of materials are well known and are exemplified by polyurethane, polyester, polystyrene-polydiene, polyether, and polyesteramides and polyetherestamides. Typically, these materials are block or graft copolymers.

Preferred among the thermoplastic elastomers are polyurethane and polystyrene-polydiene. The later is commercially available and sold as KRATON®, a trademark of Shell Chemical Company. Polyurethane is particularly preferred and is further described.

Polyurethane

The polyurethane polymers which may be used within the scope of the present invention include those which are prepared from long chain polyols reacted with diisocyanates and chain extenders. Polyols can be of two basic types, either polyester-type or polyether-type. Polyester-type polyols usable herein can be hydroxyl terminated polyesters prepared from adipic acid and an excess of glycol, such as ethylene glycol, neopentyl glycol, hexanediol-1,6, and the like or mixtures thereof. Polyethers usable herein include poly(oxypropylene) glycols and poly(oxytetramethylene) glycols. For example, polyalkyleneether glycols can be mixed with a molar excess of an organic diisocyanates to form urethane linkages in a linear polymer. This linear polymer can be reacted with a chain extending agent, such as water, diamine, or a hydroxy-amine.

The term "polyalkyleneether glycol" refers to a polyalkyleneether which contains terminal hydroxy groups. These compounds for example, can be derived from the polymerization of cyclic ethers such as alkylene oxides or dioxolane or from the condensation of polyalkylene glycols. They are sometimes known as polyalkylene glycols or polyalkylene oxide glycols. Those useful herein may be represented by the formula $HO(RO)_nH$, in which R stands for an alkylene radical and n is an integer sufficiently large that the molecular weight of the compound is at least 750, i.e. large enough that the polyoxalkylene group $—(RO)_n—$ has a formula weight of at least 732. Not all of the alkylene radicals present need be the same. Glycols containing a mixture of radicals, as in the compound $HO(CH_2OC_2H_4O)_nH$ can be used. These glycols are either viscous liquids or waxy solids. To be of value in preparing the usuable polyurethanes, the molecular weight of the glycol should be at least 750 and may be as high as 10,000. The molecular weight is preferably between 750 and 3,500. Polytetramethyleneether glycol, is a usuable glycol for making. Polyethylleneether glycol, polypropyleneether glycol and poly-1,2-dimethylethyleneether glycol are representative of other operable glycol compounds.

Additionally, polyether-thioether glycols, polyalkylene-arylene-ether glycols and polyalkylene-arylene-ether glycols are examples of this first class of polyols. Of the second class of polyols usuable herein, e.g. the polyesters, there are conceptually two classes, poly(oxypropylene) glycols and poly(oxytetramethylene) glycols. As an example, polyalkylene ester glycols can be usuable herein.

The term "polyalkyleneester glycol" refers to a polyalkyleneester which contains terminal hydroxy groups and may be represented by the formula

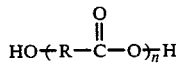

in which R stands for an alkylene radical and n is an integer sufficiently large that the molecular weight of the compound is at least 750. Glycols can contain a mixture of radicals. The compound ethylene glycol, can be used with this ester. Other glycols can include 1,4-butanediol, 1,6-hexanediol, hydroquinone, bis(2-hydroxyethyl) ether, are representative of other operable compounds. The molecular weight of the glycol should be at least 750 and may be as high as 10,000. The molecular weight is preferably between 750 and 3500.

Any of a wide variety of diisocyanate compounds may be used in the polymerization to prepare the polyurethane polymer usuable herein. Aromatic diisocyanates, such as toluene-2,4-diisocyanate (and its dimers), 4,4'-methylene-bis(phenyl isocyanate), 1,5-naphthylene diisocyanate and 4-tertbutyl m-phenylene diisocyanate are usable herein. Diphenyl methane diisocyanate may be particularly advantageous for use herein. This compound is available from Upjohn Polymer Chemicals as Isonate ™ 215, and can be used in crude form or in pure form. Aliphatic compounds such as hexamethylene diisocyanate and tetramethylene diisocyanate, and the alicyclic compounds such as 1,4-cyclohexylene diisocyanate may be operable. Of the wide variety of diisocyanates usuable herein, including but not limited to: 1,3-bis(3-isocyanato-p-tolyl) urea; 4,4'-methylene di-o-tolylisocyanate; 4-methoxy-m-phenylene diisocyanate; 4-propyloxy-m-phenylene diisocyanate; 4-chloro-m-phenylene diisocyanate; 4-bromo-m-phenylene diisocyanate; hexamethylene diisocyanate; tetramethylene diisocyanate; and 1,4-cyclohexylene diisocyanate, may be operable herein.

In addition, the following polyisocyanates may be usable: isophorone diisocyanate:

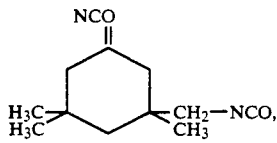

4,4'-dicyclohexylene methane diisocyanate:

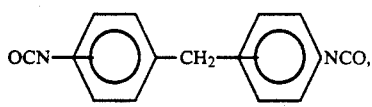

3,3'-dimethyl-4,4'-bisphenyl diisocyanate:

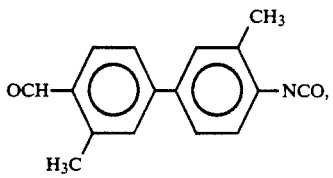

1,4-benzene diisocyanate:

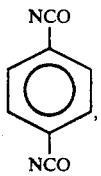

1,5-naphthalene diisocyanate:

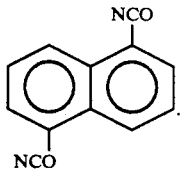

It is to be understood that these diisocyanates may be used either singly or in combination.

The chain-extending agent can contain a plurality of active hydrogen atoms, with up to two atoms in the molecule having active hydrogen attached thereto. A preferred chain extending agent is 1,4-butanediol. Suitable chain-extending agents include glycols, diamines, dicarboxy acids, dicarboxy amides, disulfonic acids and disulfonamides. Representative compounds include ethylene diamine, m-tolylene diamine, benzidine, diethylene glycol, hydrazine, succinic acid and 1,4-butanedisulfonic acid. (1,4-butanediol is available from Dupont.)

Urethane polymers contemplated as possibly usable herein include conventional reactive urethane polymers. These polymers include multifunctional urethanes prepared from isocyanates.

The polyurethane polymer can be prepared by either mixing all of the ingredients together or by first reacting the polyol with the diisocyante then reacting that combination with the chain extender, either by batch method, in a mixing chamber or extruder.

Other Additives

The inventive polymer blend may also include other additives such as antioxidants, dyes, other fillers or reinforcing agents, fire resistant materials, mold release agents, colorants and other materials designed to improve the processability of the polymers or the properties of the resulting compound. Such additives are added prior to, together with, or subsequent to the blending of the polyketone, glass fibers, mineral fillers, and thermoplastic polyurethane polymer.

The Process

The impact modified polymer blend of this invention is prepared by suitably admixing the polyketone, reinforcing material, and thermoplastic elastomer. Typically, conventional stabilizers are also added to the blend.

The blend components are admixed by conventional methods suitable for forming an intimate mixture of the various components. Such methods include dry blending of the components in a finely divided form followed by compression molding or by extrusion of the mixture. Alternatively, the inventive polymer blend is formed by blending the components in a mixing device operating at high shear. A preferred method of combining mineral filler and polymer matrix to produce the inventive blend is by adding the filler through a downstream port into a twin screw compounding extruder. The port should be positioned in a zone where the polyketone has been fully melted. This provides the best opportunity for thoroughly dispersing the filler without introducing excessive shear stresses which can reduce the aspect ratio of the reinforcing particles. The blended composition is then formed into its final shape by a process such as extrusion, injection molding, blow-molding or thermoforming.

EXAMPLE 1—PREPARATION OF POLYMER.

A linear alternating terpolymer of carbon monoxide, ethylene, and propylene and (90/064) was produced in the presence of a catalyst composition formed from palladium acetate, trifluoroacetic acid and 1,3-bis[di(2-methoxyphenyl)phosphino]propane. The polyketone polymers had a melting point of about 220° C. and an LVN of about 1.1 dl/g when measured in m-cresol at 60° C. The polyketone polymers also contained 0.5% Ethanox 330 and 0.5% Nucrel 535.

EXAMPLE 2

Blends of polyketone and selected thermoplastic elastomers were prepared by tumble blending the ingredients followed by compounding in a 30 mm corotating twin screw extruder operated at a melt temperature of 240° C. The extruded nibs were dried for 4 hours at 150° F. then injection molded into family test specimens (ASTM). The melt temperature during injection molding was 270° C. The injection molder was a 1.5 oz. Arburg. Tables I and II list the blends that were prepared and their measured mechanical properties.

TABLE I

| Sample | Notched Izod Impact (Ft. lb/in.) | Flex Modulus (psi) | Tensile Properties | |
|---|---|---|---|---|
| | | | TS @ hr. @ Br | % El. |
| 1. Control 90/064 Polymer | 1.3 | 290,000 | 9700 | 30.0 |
| 2. +5% Kraton | 1.5 | 275,000 | 8400 | 30.0 |

TABLE I-continued

| Sample | Notched Izod Impact (Ft. lb/in.) | Flex Modulus (psi) | Tensile Properties TS @ hr. @ Br | % El. |
|---|---|---|---|---|
| 1901X Rubber | | | | |
| 3. +20% Mica 10% OCF BC | 0.7 | 888,000 | 9945 | 6.0 |
| 4. +20% Mica +10% OCF BC +5% Kraton 1901X Rubber | 0.8 | 525,000 | 7664 | 8.0 |

All this data is for reinforcement added at the main feed in our 30 mm Haake. Leads to lower IZOD, strength, and modulus.

TABLE 2

| Sample Nos. | Notched Izod (Ft. lb/in) | Flex Modulus (psi) | Tensile TS @ hr. (psi) | % El. @ Br |
|---|---|---|---|---|
| 1. Control 90/064 | 1.3 | 290,000 | 9700 | 30 |
| 2. +20% Urethane | 4.6 | 190,000 | 6173 | 48 |
| 3. +20% Mica 10% OCF BC | 0.7 | 888,000 | 9945 | 6 |
| 4. +20% Mica 10% OCF BC 70% Urethane | 1.2 | 536,000 | 7330 | 9 |

Table 1 and 2 illustrate that the two thermoplastic elastomers improve the notched IZOD impact and/or the elongation of the neat polymer. The addition of the mica and fiberglass reinforces the polymer by increasing modulus, and strength with a sacrifice of IZOD impact and elongation. For each polymer blend, the thermoplastic elastomer when added with reinforcement provides for a balance of properties, including but not limited to improved modulus and strength (from the reinforcement) and a higher IZOD impact resistance and elongation-at-break which is attributable to the presence therein of the thermoplastic elastomeric material. The polyurethane is more effective than the KRATON ® 1901X rubber, a SBS functionalized block copolymer.

While this invention has been described in detail for the purpose of illustration, it is not to be construed as limited thereby but is intended to cover all changes and modifications within the spirit and scope thereof.

That which is claimed is:

1. A polymer blend having improved balance of mechanical properties comprising a linear alternating polymer of carbon monoxide and at least one ethylenically unsaturated hydrocarbon, a reinforcement material, and a thermoplastic elastomer.

2. A composition as in claim 1 wherein said thermoplastic elastomer is selected from the group consisting of polyurethane, polyester, polyether, polystyrene-polydiene, and polyesteramides and polyetheresteramides.

3. A composition as in claim 1 wherein said thermoplastic elastomer is polyurethane.

4. A composition as in claim 1 wherein said reinforcement material is mica and glass fiber.

5. A composition as in claim 1 wherein said mica and glass fiber are present in an amount of from about 5 to 40 weight percent.

6. A composition as in claim 1 wherein said mica and glass fiber are present in an amount of from about 5 to 10 weight percent.

7. A composition as in claim 1 wherein said reinforcement material is fiberglass present in an amount of from about 1 to 40 weight percent.

8. A composition as in claim 1 wherein said reinforcement material is a mineral filler present in an amount of from 1 to 40 weight percent.

9. A composition as in claim 8 wherein said mineral filler is mica.

10. A composition as in claim 4 wherein said mica and fiber glass are present in amounts of about 20 and 10 weight percent respectively.

11. A polymer blend having improved balance of mechanical properties comprising: a linear alternating polymer of carbon monoxide and at least one ethylenically unsaturated hydrocarbon; a reinforcement material; and polyurethane.

12. A composition as in claim 11 wherein said reinforcement material is mica and glass fiber present in an amount of from 5 to 40 weight percent.

13. A composition as in claim 11 wherein mica and glass fiber are present in amounts of about 20 and 10 weight percent respectively.

14. A shaped article of manufacture produced from the composition of claim 1.

* * * * *